3,420,625
RECRYSTALLIZATION OF ANHYDROUS CALCIUM ACID PHOSPHATE FROM THE DIHYDRATE FORM
Joseph M. Margolis, South Euclid, Ohio, assignor to General Electric Company, a corporation of New York
Continuation-in-part of application Ser. No. 505,909, Nov. 1, 1965. This application Dec. 13, 1965, Ser. No. 517,500
U.S. Cl. 23—108                8 Claims
Int. Cl. C01b 25/32; B01j 17/04

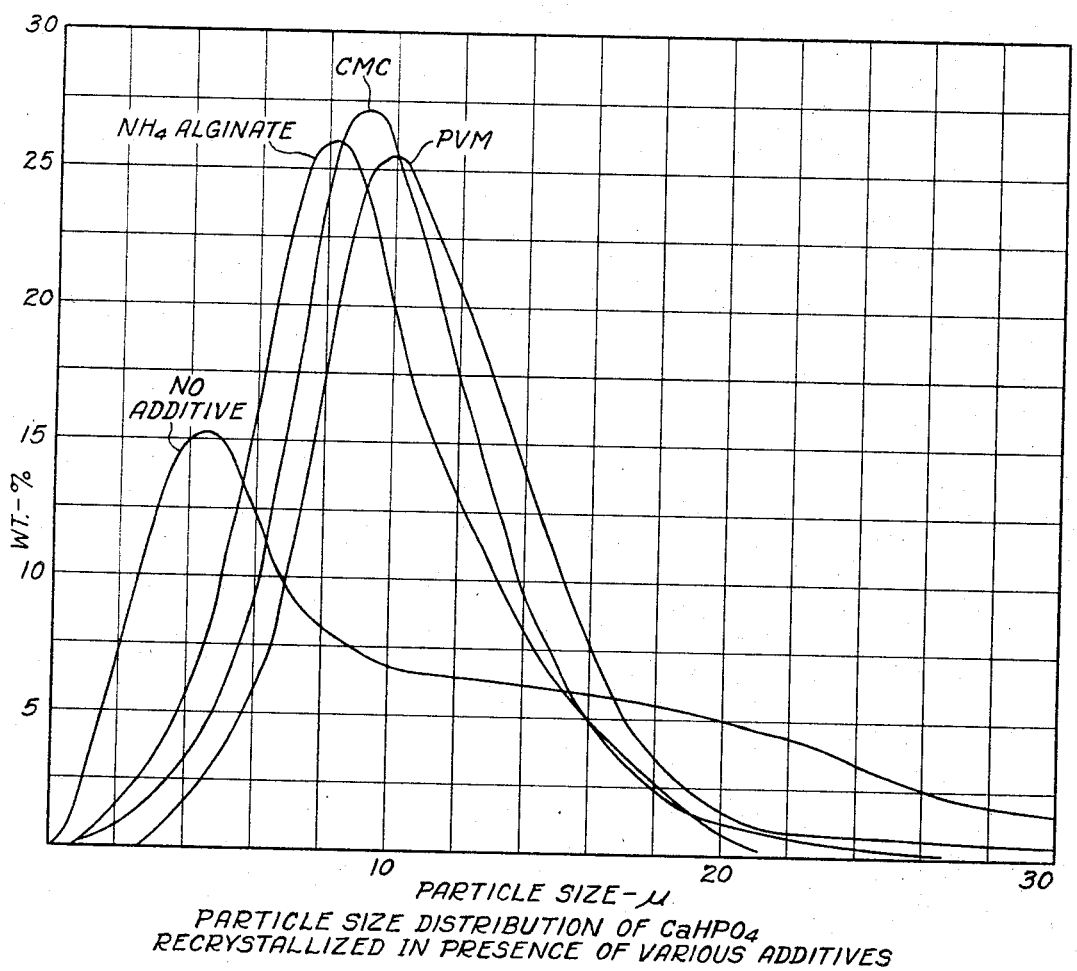
PARTICLE SIZE DISTRIBUTION OF CaHPO$_4$
RECRYSTALLIZED IN PRESENCE OF VARIOUS ADDITIVES United States Patent Office 3,420,625
Patented Jan. 7, 1969

This application is a continuation-in-part of applicant's copending application Ser. No. 505,909, filed Nov. 1, 1965, now abandoned.

This invention concerns a process for converting calcium acid phosphate dihydrate $CaHPO_4 \cdot 2H_2O$ into anhydrous calcium acid phosphate ($CaHPO_4$); more particularly it concerns such a process for producing $CaHPO_4$ having a desirable particle size distribution.

$CaHPO_4$ is widely used as a batch constituent in the manufacture of calcium halophosphate phosphors, in addition to having various other uses in chemical manufacturing. Control of the particle size distribution of $CaHPO_4$ is quite important in phosphor manufacture since the size and shape of the $CaHPO_4$ batch constituent largely determines the size and shape of the resulting phosphor particles. For the production of lamp phosphors, it is generally desirable that as much as possible of the $CaHPO_4$ be within the particle size range of 3–20 microns in diameter. Substantial amounts of fines in the size range of 1–3 microns and smaller cause detrimental sintering.

Generally, phosphor particles outside the preferred size range are removed by various known classification techniques, and the phosphor may be comminuted to make use of the oversized particles. However, excessive comminution, such as by ball-milling is harmful to the resulting phosphor both because of the production of excessive quantities of fines and by damaging the phosphor crystals.

However, known methods for the particle size control of $CaHPO_4$ still result in the production of undesirably large amounts of material having particle sizes outside the preferred range or in substantial material losses if size classification is used.

The process most often used involves conversion or dehydration, in an acid medium, of $CaHPO_4 \cdot 2H_2O$, to anhydrous $CaHPO_4$, preferably at a pH of from 3 to 5 in a solution of water and a suitable acid. The reaction is often referred to as recrystallization. As the temperature of the solution is raised to above 75° C., the desired $CaHPO_4$ crystals start to form. The conversion begins to become rapid at 82° C., and higher temperatures can be used, preferably below boiling. The aqueous suspension can be the original mother liquor in which the $CaHPO_4 \cdot 2H_2O$ is produced, or previously manufactured $CaHPO_4 \cdot 2H_2O$ can be used in a synthetic mother liquor or in another dilute acid solution. This conversion procedure aids in purifying the $CaHPO_4 \cdot 2H_2O$ and in removing the difficult-to-remove water of hydration at low temperatures thereby avoiding excessive particle growth. The resultant particle size depends partly on the particle size of the $CaHPO_4 \cdot 2H_2O$ formed or supplied. However, during conversion by the methods of the prior art the dihydrate may form undesirable fines.

Accordingly, it is an object of the present invention to provide a procedure for improving the particle size distribution of $CaHPO_4$ while retaining other beneficial aspects of presently used procedures.

Another object is to limit the particle size distribution of $CaHPO_4$ predominantly to the size range of 3–20 microns as measured by the Andreasen pipet sedimentation method.

Still another object is to provide improved materials for the production of improved fluorescent lamps.

Further objects and advantages of the invention will appear from the following detailed description of species thereof and from the accompanying drawing.

Briefly stated, according to certain aspects of the present invention, I have found that water-soluble high molecular weight polycarboxylic acids and their water-soluble anhydrides and ammonium and alkali metal salts, when used as additives in amounts of about 0.35–0.7 grams per kilogram of $CaHPO_4 \cdot 2H_2O$ in a recrystallization process in an acidic aqueous medium, are effective in narrowing the particle size distribution of the resultant $CaHPO_4$, in shifting the modal size to large values, and in greatly decreasing the amount of product having particle sizes either under 3 microns or over 20 microns. Additives that have been found to be effective include, for example, naturally occurring polymers containing carboxyl groups, e.g. ammonium alginate, and naturally occurring polymers which have been modified to contain carboxyl groups, e.g. ammonium carboxymethylcellulose (obtained from CMC sodium salt), synthetic polymers containing carboxyl groups, e.g. polyacrylic acid, ammonium polymethacrylate, and synthetic ethylene maleic anhydride copolymer and copolymers of vinyl methyl ether and maleic anhydride. The water-soluble anhydrides hydrolyze to form the corresponding carboxylic acids on addition of water. Likewise, the ammonium salts utilized will generally break down on mixing with acidic media to the corresponding carboxylic acid and an ionized ammonium salt of the acidic media. I have found in several cases that corresponding ammonium salts of compounds are preferable for use with the process of the invention.

Although the choice of additives will be partly controlled by economic considerations, other additives which are expected to be effective include, for example, naturally occurring water-soluble high molecular weight compounds containing carboxyl groups (—COOH), e.g., alginic acid and its water-soluble ammonium and alkali metal salts, e.g., sodium alginate, ammonium alginate, potassium alginate, rubidium alginate, cesium alginate; naturally occurring polymers which have been made water-soluble by modification to contain carboxyl groups, e.g., carboxymethylcellulose, carboxycellulose, their water-soluble salts, e.g., the ammonium and alkali metal salts of carboxycellulose, water-soluble polymers and copolymers containing carboxyl groups, e.g., the water-soluble polymers of acrylic acid, methacrylic acid, water-soluble copolymers thereof with other monomers which may but need not contain a carboxyl group, e.g., water-soluble styrene-acrylic acid copolymers, water-soluble vinyl acetate-methacrylic acid copolymers, water-solube ethylene-acrylic acid copolymers, water-soluble acrylic acid-methacrylic copolymers, etc., and the ammonium and alkali metal salts thereof; water-soluble copolymers containing anhydride groups, which in the presence of water are hydrolyzed to produce carboxyl groups and in the presence of a base will produce salts, e.g., water-soluble styrene-maleic anhydride copolymers, water-soluble ethylene-maleic anhydride copolymers, water-soluble vinyl methyl ether-maleic anhydride copolymers, etc., and the ammonium and alkali metal salts thereof. If the hydrolysis or reaction with base is only partial, then the polymers will still contain anhydride groups in addition to the carboxyl group. These materials are generically classified as water-soluble compounds containing carboxyl groups and their water-soluble salts or more specifically, as compounds selected from the group consisting of water-soluble compounds containing anhydride groups, water-soluble compounds containing carboxyl groups and their ammonium and alkali metal salts.

Calcium halophosphate phosphors made from $CaHPO_4$ prepared according to the present invention have been found not to require ball-milling to nearly as great an extent as those made from $CaHPO_4$ prepared by previously known processes. Eliminating the need for ball-milling for the purpose of breaking up phosphor agglomerates in the preparation of phosphor suspensions for lamp coating is desirable in that it results in superior phosphors and lamps having greater light output.

In addition to increasing the average crystal size and narrowing the particle size distribution of $CaHPO_4$, the use of the present invention largely avoids the troublesome intermediate gelation step which takes place during the recrystallization by preivously known methods. This facilitates stirring and thereby improves heat transfer during the recrystallization without requiring as vigorous agitation.

The following description is an example of the process of the invention. Eighteen kg. of $CaHPO_4 \cdot 2H_2O$ are placed in a 50-gallon steam kettle, 140 liters of deionized water are added and the suspension is mechanically stirred; 250 cc. of $HNO_3$ are added, and, after thorough mixing, the pH is about 5. The additive such as PVM is then added and the batch is heated. The agitation of the slurry by a mechanical agitator is augmented by circulation within the kettle by using a fast-acting pump whose inlet and outlet are in the slurry. The temperature is raised to about 90–92° C. with conversion beginning to proceed rapidly at about 82° C. The progress of the recrystallization process can be followed by microscopic examination of samples taken periodically from the kettle. About one hour is required for essentially complete conversion of this batch after attainment of temperature. The product is then filtered, washed and dried.

Alternatively, hot water at about 95° C. can be supplied initially, and the reaction conducted as above. The concentration of acid and water may be varied to suit conditions.

Both temperature and rate of stirring can be controlled at will to determine the final particle size, depending on empirical factors such as kettle size, pump capacity, impeller type and size, among others.

The following table shows the effect of various additives to the recrystallization medium on the particle size distribution of the resultant $CaHPO_4$. The control was a batch processed by methods of the prior art, and it corresponds to the peak marked "no additive" in the drawing. The CMC, PVM–MA, and ammonium alginate entries in the table correspond to the peaks so indicated in the drawing. The amounts in the table are specified as grams of additives per kilogram of $CaHPO_4 \cdot 2H_2O$. Particle size is expressed in the table in terms of microns ($\mu$).

TABLE.—RESULTS OF USING ADDITIVES

| Additive | Amount (gr./kg.) | Modal size | Percent smaller than $3\mu$ | Percent larger than $20\mu$ |
| --- | --- | --- | --- | --- |
| Control | | 4.3 | 8.0 | 23 |
| Ammonium carboxymethylcellulose (CMC) | 0.5 | 9.5 | 1.6 | 4.6 |
| Ammonium salt of copolymer of vinyl methyl ether and maleic anhydride (PVM–MA) | 0.6 | 9.8 | 0.6 | 8.4 |
| Ammonium alginate | 0.5 | 8.5 | 1.0 | 5.6 |
| Ammonium salt of polyacrylic acid | 0.7 | 10.0 | 1.0 | 19 |
| Ammonium polymethacrylate | 0.7 | 8.5 | 1.4 | 10.5 |

Suitable polyacrylic acid is marketed by the Rohm & Haas Co. as Acrysol A–5, and ammonium polymethacrylate is marketed by Imperial Chemical Industries, Ltd., under the name of Vulcastab. Sodium alginate and potassium carboxymethylcellulose have been found to exhibit the advantages of the invention.

Representative compounds of various classes other than water-soluble high molecular weight polycarboxylic acids and their water-soluble anhydrides and ammonium and alkali metal salts were tested to determine whether the class of compounds of the invention was unique. Carbohydrates, short-chain and low molecular weight (carboxylic) organic acids including sorbic acid, azelaic acid and citric acid, alcohols, amines, polyalkalene ethers and non-carboxylic gums were tested, but none gave the narrow distribution of larger crystalline size obtained with compounds of the invention. Thus, the term high molecular weight is used herein to distinguish compounds of the type found to be operative with the invention, whether polymeric or monomeric, from those of low molecular weight found to be inoperative. Also, it appears desirable to have a multiplicity of carboxyl groups in the compound, as called for by the term polycarboxylic.

The additives of the invention are apparently tightly adsorbed on the $CaHPO_4$ crystals during the recrystallization process, and the resultant crystals, upon heating, develop tan coloration as if the organic additive had undergone charring. In addition, this recrystallization process results in crystals that have a plate-like structure rather than their characteristic triclinic form. This would indicate that the adsorbed additive is repressing crystal growth along one axis while the growth proceeds along the other two axes, resulting in the plate-like form. Neither the additive adsorption nor the plate-like crystal structure of this $CaHPO_4$ appears to have any deleterious effect on phosphor manufacture. In fact, the structure seems to be desirable.

While specific examples have been given of the process of the invention, it will be understood that various changes, omissions and substitutions may be made within the true spirit and scope of the invention as defined in the appended claims.

What I claim as new and desire to secure by Letters Patent of the United States is:

1. In the process of converting $CaHPO_4 \cdot 2H_2O$ to $CaHPO_4$ by recrystallization in an acidic aqueous medium wherein $CaHPO_4 \cdot 2H_2O$ of the desired particle size distribution is suspended in the medium, and the medium is then heated to cause formation of $CaHPO_4$ of a desired particle size distribution, the improvement consisting of adding to the medium before recrystallization about 0.35–0.7 gram of an additive per kilogram of $CaHPO_4 \cdot 2H_2O$ wherein the additive is at least one compound selected from the group consisting of water-soluble high molecular weight polycarboxylic acids and their water-soluble anhydrides and ammonium and alkali metal salts, whereby the particle size distribution of the resulting $CaHPO_4$ is substantially narrower than without the use of said additive.

2. The process of claim 1 in which the compounds are selected from the group consisting of ammonium carboxymethylcellulose, ammonium salts of copolymers of vinyl methyl ether and maleic anhydride, ammonium alginate, ammonium salts of polyacrylic acid, ammonium polymethacrylate, and ethylene maleic anhydride copolymer.

3. The process of claim 1 in which the additive is ammonium carboxymethylcellulose.

4. The process of claim 1 in which the additive is a copolymer of vinyl methyl ether and maleic anhydride.

5. The process of claim 1 in which the additive is ammonium alginate.

6. The process of claim 1 in which the additive is polyacrylic acid.

7. The process of claim 1 in which the additive is ammonium polymethacrylate.

8. The process of claim 1 in which the additive is ethylene maleic anhydride copolymer.

(References on following page)

References Cited

UNITED STATES PATENTS

| 1,818,114 | 8/1931 | Carothers | 23—109 |
| 2,160,232 | 5/1939 | Schlaeger | 23—108 |
| 3,118,730 | 1/1964 | Nickerson | 23—109 |

NORMAN YUDKOFF, *Primary Examiner.*

EUGENE P. HINES, *Assistant Examiner.*

U.S. Cl. X.R.

23—300, 304; 99—91